United States Patent [19]

Thomson et al.

[11] Patent Number: 5,638,859
[45] Date of Patent: Jun. 17, 1997

[54] FLOAT CONTROLLED VALVE

[75] Inventors: Robert G. Thomson; John E. Thelen, both of Ocala, Fla.

[73] Assignee: Flair-Pneumatic Products Corp., Ocala, Fla.

[21] Appl. No.: 336,653

[22] Filed: Nov. 4, 1994

[51] Int. Cl.$^6$ .................... F16K 31/34; F16K 33/00
[52] U.S. Cl. .................................. 137/414; 137/416
[58] Field of Search ........................ 137/195, 202, 137/389, 390, 412, 413, 414, 415, 416, 422, 423, 434, 442, 443, 444, 428; 251/25, 28

[56] References Cited

U.S. PATENT DOCUMENTS

| | | | |
|---|---|---|---|
| 1,313,889 | 8/1919 | Ford | 137/416 |
| 1,705,367 | 3/1929 | Kennedy | 137/416 |
| 1,709,678 | 4/1929 | Miller | 137/445 |
| 2,060,723 | 11/1936 | Brisacher | 137/413 |
| 2,187,708 | 1/1940 | Cibulka | 137/195 |
| 2,455,747 | 12/1948 | Fischer et al. | 137/434 |
| 2,735,442 | 2/1956 | Kenney | 137/413 |
| 2,738,947 | 3/1956 | Hjulian | 137/416 |
| 2,893,427 | 7/1959 | Felgate | 137/625.27 |
| 2,944,562 | 7/1960 | Glasgow et al. | 137/414 |
| 3,052,254 | 9/1962 | Parks | 137/84 |
| 3,120,241 | 2/1964 | Parks | 137/413 |
| 3,450,152 | 6/1969 | Quellette | 137/414 |
| 3,457,947 | 7/1969 | Fitzgerald | 137/444 |
| 3,860,028 | 1/1975 | Moore | 137/413 |
| 4,431,025 | 2/1984 | Edwards | 137/422 |
| 4,436,109 | 3/1984 | Taylor | 137/413 |
| 4,505,288 | 3/1985 | Murphy, Jr. et al. | 137/414 |
| 4,512,365 | 4/1985 | Jacobs et al. | 137/413 |
| 4,540,016 | 9/1985 | Sladky | 137/413 |
| 4,543,973 | 10/1985 | Ho | 137/413 |
| 4,562,855 | 1/1986 | Cummings et al. | 137/413 |
| 4,655,244 | 4/1987 | Park | 137/416 |
| 4,779,640 | 10/1988 | Cummings et al. | 137/413 |
| 5,004,004 | 4/1991 | Cummings | 137/413 |
| 5,067,516 | 11/1991 | Gale | 137/414 |
| 5,080,126 | 1/1992 | De Rycke et al. | 137/209 |

*Primary Examiner*—George L. Walton
*Attorney, Agent, or Firm*—Shefte, Pinckney & Sawyer

[57] ABSTRACT

A drain valve is disclosed which comprises a float chamber for accumulating a fluid. A float is disposed within the float chamber for fluid level determined movement therein. A pivotable arm is operatively connected to the float. Pilot valve means are provided which comprise valve body means and valve shuttle means. The valve body means receive a portion of the pivotable arm and have a valve seat and an inlet in communication with a source of pressure and an outlet. Valve shuttle means are provided for controlling fluid flow from the float chamber in response to the movement of the float and pivotable arm. The valve shuttle means have a closed position wherein the source of pressure maintains the valve shuttle means in sealed relation with the valve seat and an open position wherein the valve shuttle means is not in sealed relation to the valve seat such that that inlet is communication with the outlet. Poppet valve means are provided which are operable by the pilot valve means for draining the liquid accumulated in the float chamber.

45 Claims, 6 Drawing Sheets

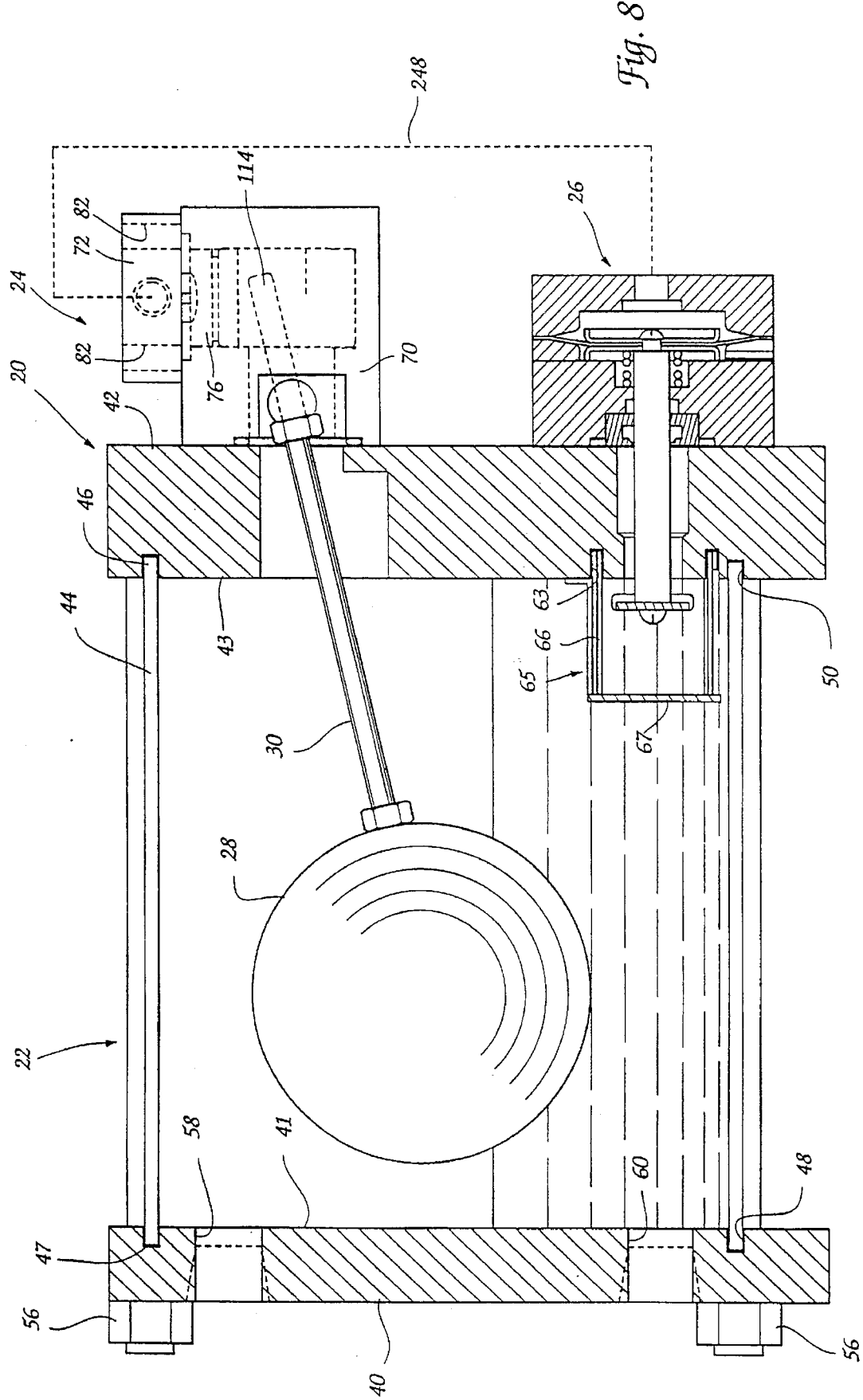

FLOAT CONTROLLED VALVE

FIELD OF THE INVENTION

The present invention relates generally to a float controlled valve, and more particularly to a pilot operated float controlled valve for draining condensed water, oil, and other liquids from a pneumatic system.

BACKGROUND OF THE INVENTION

There is a need for an improved apparatus for removing condensed water, oil, contaminants and other liquids from a compressed air system. It is desirable to allow a quantity of water to accumulate over time and then remove the collected water all at once. It is preferable to have a drain valve that operates automatically to periodically remove water from the compressed air system during normal operation thereof.

Known automatic methods to accomplish automatic water removal include: float traps, timed drain valves, demand type electronic drain valves, and flow drain valves utilizing a pneumatic pilot system.

Float trap designs typically take the direct approach of using the buoyant force of a float to directly lift a poppet valve from its seat to drain accumulated liquids. When the liquid level falls, the float falls and the valve closes. The major limitation of the float trap that is the valve seat area is limited by the buoyant force available to overcome internal pressure acting to hold the valve closed. Operation at higher pressure requires either a larger float or a smaller valve seat, in order that the buoyant force available is always greater than the force of internal pressure holding the valve poppet closed.

Similarly, magnetically coupled drain valves are known as disclosed, for example, in U.S. Pat. Nos. 2,893,427 and 5,080,126. These prior art devices suffer from the limitation of limited force available to keep the valve closed and the necessity of having two valve seats, each of which has to be sealed depending on the position of the valve. As such, it should be appreciated that there is a continuing need for a new and improved pneumatically piloted, float drain valve as set forth by the present invention which addresses the above-mentioned problems.

OBJECTS AND SUMMARY THE INVENTION

It is, therefore, an object of the present invention to provide an apparatus for draining liquid from a pressurized system which eliminates or obviates the above-mentioned problems.

It is another object of the present invention to provide a pilot valve which operates the drain valve.

It is another object of the present invention to provide a pilot valve which is isolated from particulate contaminants in the float chamber assembly.

It is another object of the present invention to provide a float controlled valve in which the valve seat area is not limited by float geometry.

It is another object of the present invention to provide a pilot-operated valve which operates with a snap action thus eliminating valve throttling of the pilot supply to the drain valve.

It is another object of the present invention to provide a drain valve having a poppet valve wherein internal pressure contained in the float chamber acts to hold the popper valve closed.

It is another object of the present invention to provide a product which is simple in construction, effective in use and economical to manufacture.

It is yet another object of the present invention to provide an apparatus which provides long life and is durable for high cycle applications.

These objects are achieved by providing a float controlled valve comprising a float chamber for accumulating a fluid. A float is disposed within the float chamber for fluid level determined movement therein. A pivotal arm is operatively connected to the float. Pilot valve means comprising valve body means and valve shuttle means are provided. The valve body means receives a portion of the pivotal arm. The valve body means has a valve seat and an inlet in communication with the source of pressure and an outlet. The valve shuttle means controls fluid flow from the flow chamber in response to the movement of the float and pivotal arm. The valve shuttle means has a closed position wherein the source of pressure maintains the valve shuttle means in sealed relation to the valve seat and an open position wherein said valve means is not in sealed relation to said valve seat. Poppet valve means are provided for draining a liquid accumulated in the flow chamber.

Poppet means are provided for draining the liquid accumulated in the float chamber. The poppet means include diaphragm means for sensing pressure communicated through the pilot valve means and poppet valve means movable in response to the diaphragm means sensing pressure communicated through the pilot valve means. The diaphragm means are movable in response to changes in pressure communicated thereto with the poppet valve means being movable in conjunction with and in response to the movement of the diaphragm means.

These and other objects of the present invention will become apparent from the following detailed description and appended claims.

The invention may best be understood with reference to the accompanying drawings wherein a presently preferred illustrative embodiment is shown.

BRIEF DESCRIPTION OF THE DRAWINGS

FIG. 8 is a cross-sectional view, similar to FIG. 2, taken along line 2—2 of the float drain valve of FIG. 1 with the liquid level in the float chamber having accumulated so that the actuating pin is in the position shown in FIG. 6.

DETAILED DESCRIPTION OF THE INVENTION

Figure 1:
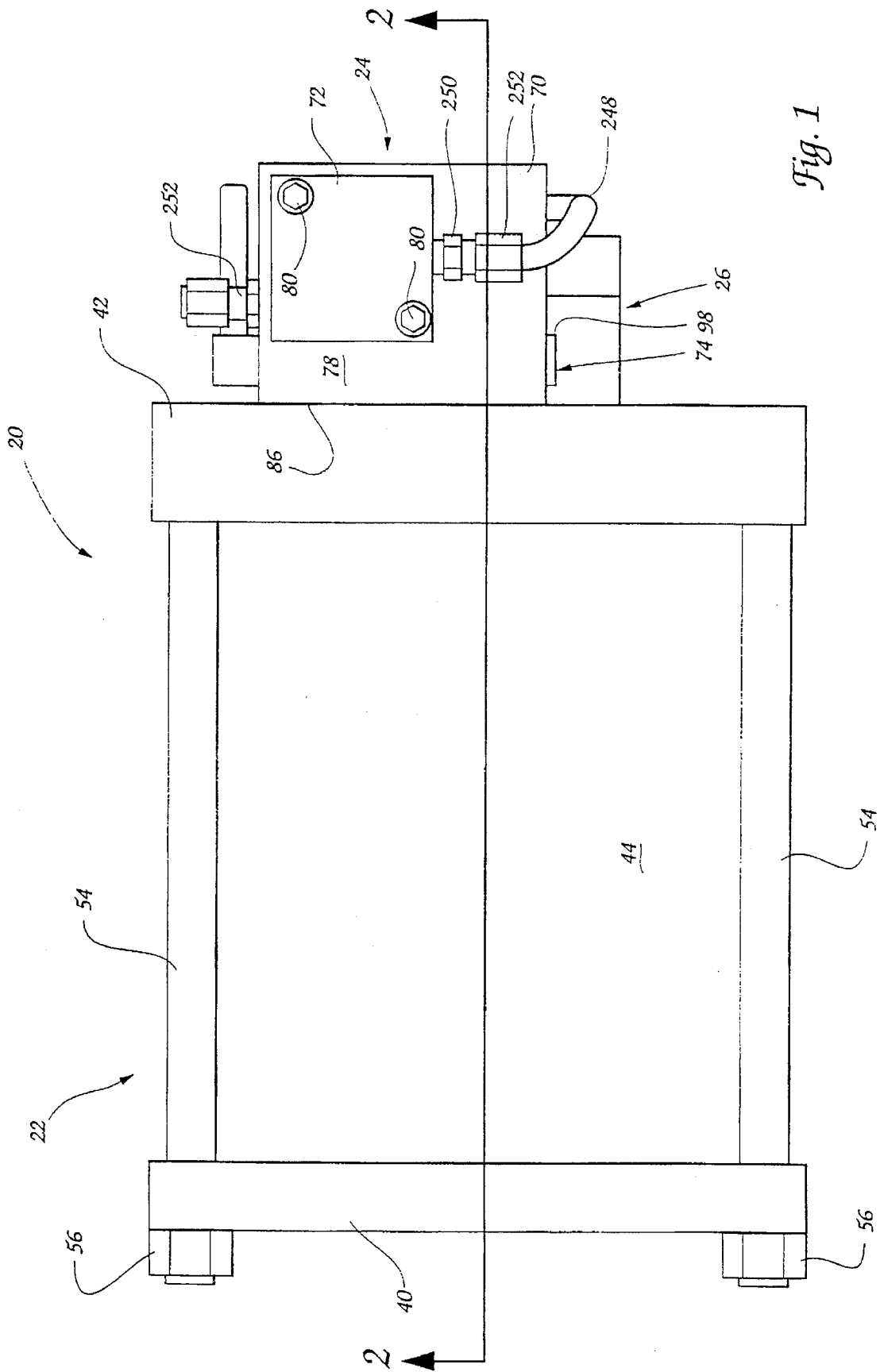
FIG. 1 is a top plan view of the pneumatically piloted float drain valve according to the present invention.
Figure 2:
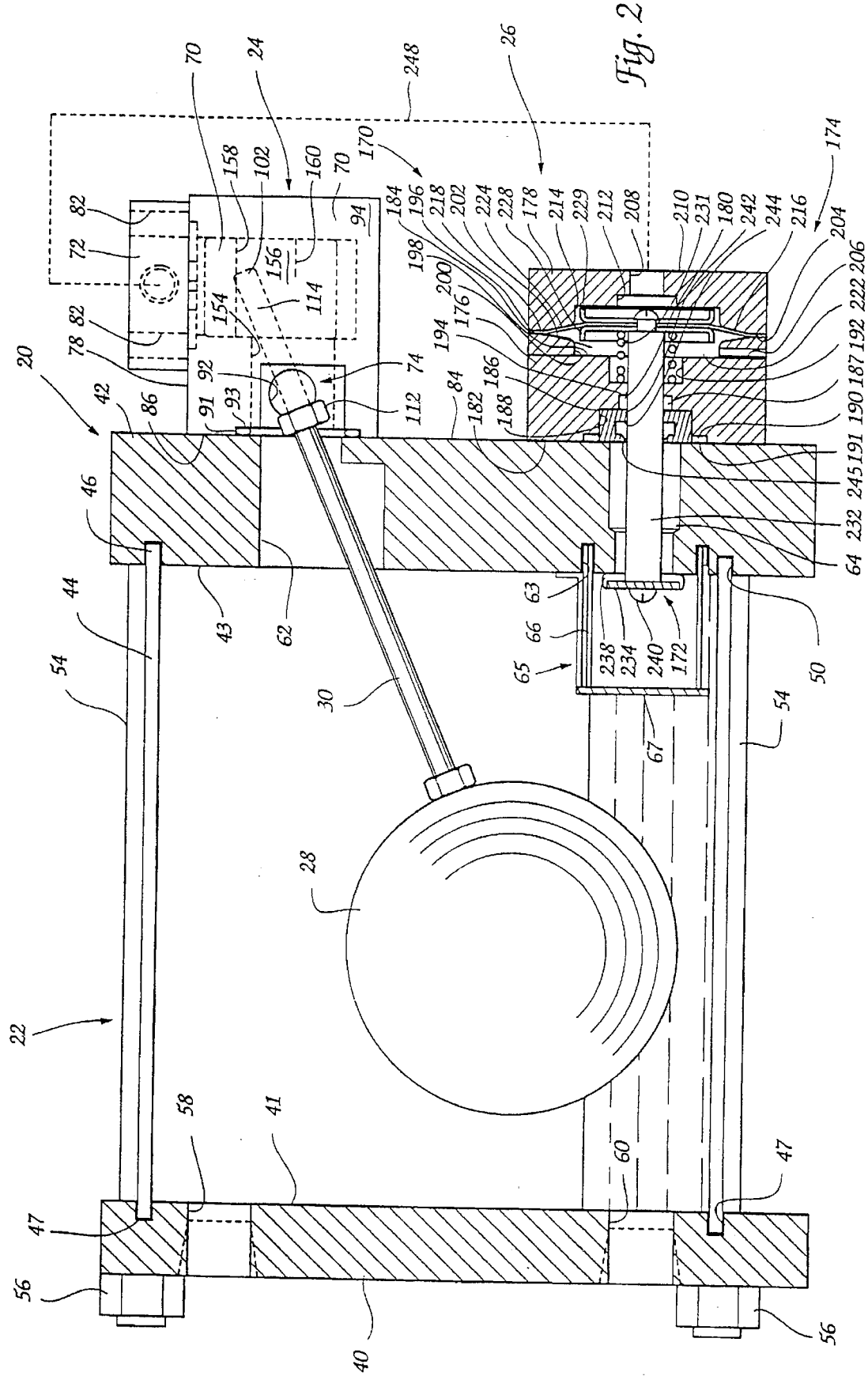
FIG. 2 is a cross-sectional view taken along line 2—2 of the float drain valve of FIG. 1 showing the pilot valve assembly and popper valve assembly in closed positions.
Figure 3:
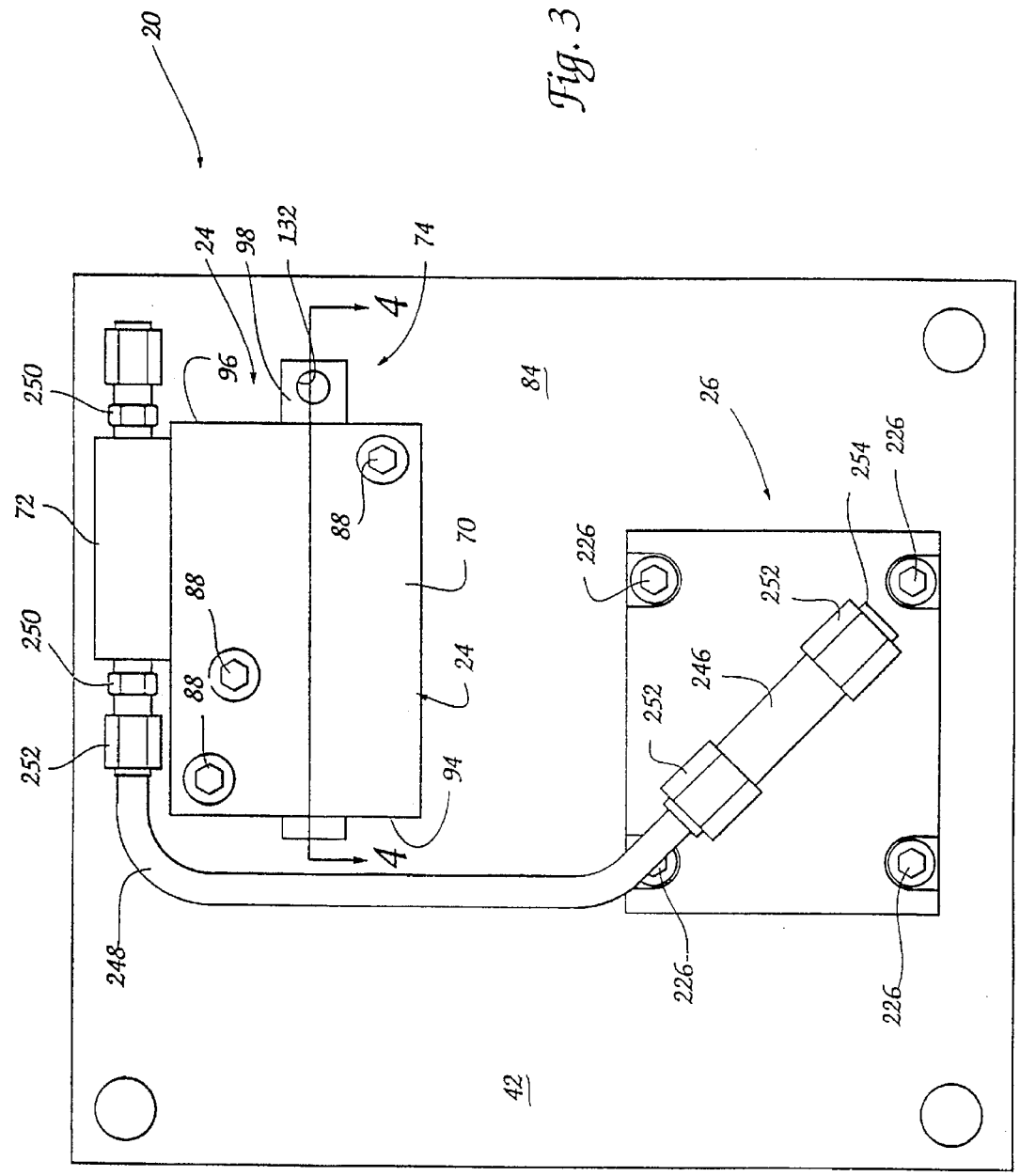
FIG. 3 is a side elevational view of the float drain valve of FIG. 1.

Referring first to FIGS. 1, 2 and 3, there is shown therein a pneumatically piloted float controlled drain valve assembly which is constructed in accordance with the principles of the present invention. In the drawings, the drain valve assembly is shown in an upright position with the pilot valve and poppet valve mounted externally on the right side of the float chamber. For convenience, the drain valve assembly will be described in relation to the orientation illustrated in FIGS. 1 and 2, and consequently, terms such as "above," "upwardly," "bottom," "right" and "left," "inboard" and "outboard" etc., as used herein are to be construed in the relative sense.

A drain valve assembly, generally indicated at 20, is shown in FIGS. 1–3 which is constructed in accordance with the principles of the present invention. Drain valve assembly 20 comprises a float chamber assembly 22, a pilot valve assembly 24, a poppet valve assembly 26, a float 28 and a pivotable arm 30. Float 28 is mounted for fluid determined movement within chamber assembly 22. Pivotal arm 30 is mounted to float 28 for pivotable movement therewith.

Float chamber assembly 22, as shown in FIG. 2, has a left side 40, a right side 42 and cylindrical tube 44. Cylindrical tube 44 has a right end 46 and a left end 47. Annular grooves 48,50 are formed in both the inner wall 41 of left side 40 and inner wall 43 of right side 42 into which left end 47 and right end 46 are mounted, respectively, in sealed relation thereto. Four rods 54 having threaded ends extend through a respective one of the corners of left side 40 and right side 42 and are threadedly tightened by bolts 56. Float chamber assembly 22 thus far described forms a sealed chamber that can be attached to a compressed air system via an input line (not shown) connected to a bottom opening 60 formed in left side 40. The input line is preferably connected to a physically low point in the compressed air system, where moisture is likely to collect. A secondary line, which is connected to a top opening 58 formed in left side 40, is preferably connected to the compressed air system at a high point where scale, rust and like are not likely to be present. Thus, in the event that the line connected to bottom opening 60 becomes contaminated or blocked by such residue, pressure will be maintained by the secondary line connected to top opening 58. Top opening 58 also serves to permit displaced air (or gas) to escape float chamber assembly 22 as liquid enters through bottom opening 60.

Right side 42 has an arm aperture 62 defined at an upper portion thereof. Pivotal arm 30 extends through aperture 62 as will be explained in greater detail below. A poppet aperture 64 is defined in right side 42 proximate the bottom of chamber assembly 22, as will be described in greater detail below. A groove 63 is defined in right side 42 radially outwardly from aperture 64 into which a strainer assembly 65 is placed. Strainer assembly 65 comprises a strainer screen 66 and a strainer cap 67. Strainer screen 66 is engaged on one end with groove 63 and on the other end with a peripheral portion of strainer cap 67.

Pilot valve assembly 24 is mounted external to float chamber assembly 22 as shown in FIGS. 1–3. As shown in FIG. 3, pilot valve assembly 24 is mounted rearwardly relative to poppet assembly 26 and is mounted near the top of float chamber assembly 22.

Figure 4:
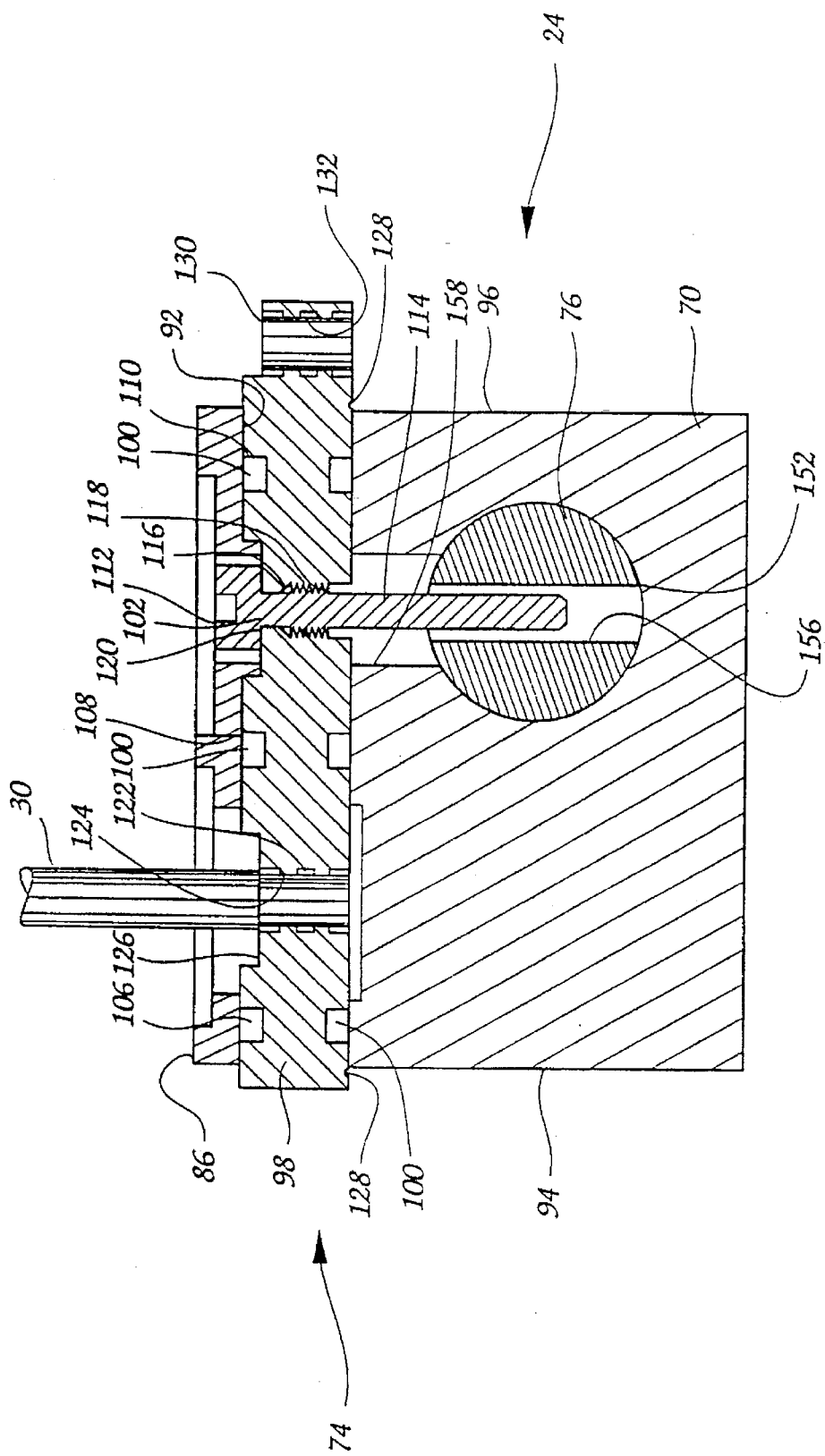
FIG. 4 is a cross-sectional view of the pilot valve assembly taken along line 4—4 of FIG. 3.
Figure 5:
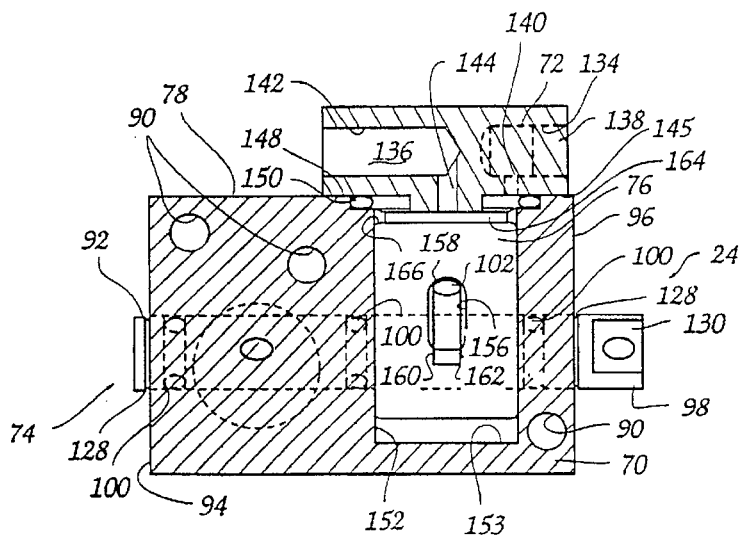
FIG. 5 is a cross-sectional view taken along line 5—5 of FIG. 2 showing the pilot valve assembly in the closed position.
Figure 7:
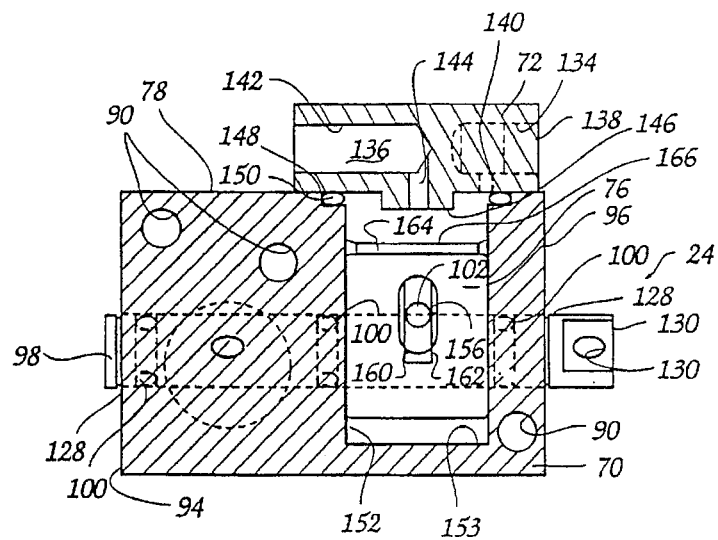
FIG. 7 is a cross-sectional view, similar to FIG. 5, of the pilot valve of FIG. 5 showing the pilot valve assembly in the open position with the valve shuttle spaced from the valve seat.

As shown in FIG. 2, pilot valve assembly 24 includes a valve body 70, a cap 72, a cross shaft assembly 74 and a shuttle 76. As shown in FIG. 3, valve cap 72 is mounted rearwardly to a top surface 78 of valve body 70 by bolts 80 which extend through bores 82 in valve cap 72 as shown in FIG. 8. As shown in FIGS. 4 and 5, a mounting surface 86 of valve body 70 is brought into contact with an outer surface 84 of right side 42 by a plurality of bolts 88 which extend through a corresponding plurality of bores 90 in valve body 70 as shown in FIG. 7. A groove 91 is defined in surface 86 into which a seal 93 is mounted.

As shown in FIG. 4, valve body 70 includes a bore 92 which extends from a front wall 94 of valve body 70 to a rear wall 96 of valve body 70, parallel to mounting surface 86.

As shown in FIG. 4, cross shaft assembly 74 includes a cross shaft 98 mounted in bore 92, a plurality of o-rings 100, an actuating pin 102 mounted to a rearward portion of cross shaft 98 and a pair of retaining clips 104 (not shown) mounted on opposite ends of cross shaft 98. Cross shaft 98 has a plurality of annular grooves comprising a first groove 106 disposed near front wall 94 within bore 92, a second groove 108 disposed between pivotal arm 30 and actuating pin 102 within bore 92, and a third groove 110 disposed near rear wall 96 within bore 92. Into each of these grooves 106, 108, 110 is mounted a corresponding o-ring 100 for providing a seal between bore 92 and cross shaft 98.

Actuating pin 102 has a head portion 112 having an integral shaft 114 extending from one side thereof. Integral shaft 114 has a threaded portion 116 which is threadedly engaged with a threaded portion 118 of cross shaft 98. Threaded portion 118 extends transverse to the longitudinal direction of cross shaft 98. Head portion 112, when actuating pin 102 is threadedly engaged with threaded portion 118, is brought into contact with shoulder 120. Cross shaft 98 has a second threaded portion 122 for receiving a threaded portion 124 of pivotable arm 30. Concentric with threaded portion 124 is a shoulder 126 into which pivotable arm 30 comes into abutting contact when second threaded 122 is threadedly engaged with threaded portion 124.

Threaded portion 122 and 124 are in a predetermined angular relationship to each other as best shown in FIG. 2 such that the amount of liquid to be contained in float chamber assembly 22 is set by this angular relationship. Disposed outside valve body 70 on cross shaft 98 are an opposing pair of annular grooves 128 for receiving retaining clips 104 (not shown) for maintaining cross shaft 98 in bore 92.

Disposed on one end of cross shaft 98 is a flat surface 130 which extends from an edge of cross shaft 98 and terminates before wall 96. Centered on flat surface 130 is a threaded hole 132 which extends transverse to the longitudinal direction of cross shaft 98. This threaded hole 132 can be used to indicate liquid level within float chamber assembly 22 and to manually actuate drain valve 20 by rotating cross shaft 98.

Figure 6:
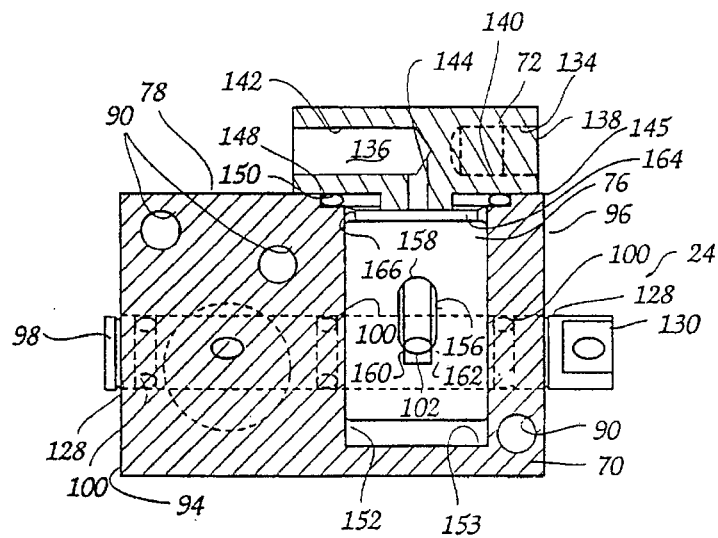
FIG. 6 is a cross-sectional view, similar to FIG. 5, of the pilot valve assembly of FIG. 5 showing the pilot valve assembly in the closed position with the actuating pin beginning to contact the elastomeric material at the bottom of the valve shuttle slot.

Cap 72, as shown in FIGS. 5, 6 and 7, has an inlet port 134 and an outlet port 136. Inlet port 134 is connected to a source of pneumatic pressure, which can be either high or low pressure depending on the application. Inlet port 134 has a horizontal passageway 138 which terminates before the vertical centerline of cap 72 and has pipe threads at one end thereof. Horizontal passageway 138 is connected at an inlet end thereof to a source of pneumatic pressure and at an outlet end thereof to a vertical passageway 140 which is in communication with a valve shuttle chamber described in greater detail below. Outlet port 136 has a horizontal passageway 142 and a vertical passageway 144. Horizontal passageway 142 has pipe threads at one end thereof. A circular boss 146 is formed on cap 72 and is centered on a bottom surface 145 thereof. Vertical passageway 144 is concentric with boss 146 and extends therethrough. Cap 72 is in contact with valve body 70 with o-ring 148 mounted in groove 150 formed in valve body 70 thereby providing a seal therebetween. Valve body 70 has a cylindrical bore 152 which extends from surface 78 terminating before the bottom surface 153 thereof. As shown in FIG. 5, cylindrical bore 152 is offset relative to the center line of valve body 70 and is always in communication with inlet port 134 and is in communication with outlet port 136, when valve shuttle 76 is in the open position as described in greater detail below. As shown in FIG. 4, a second cylindrical bore 154 extends from surface 86 terminating in bore 92 and is in communication with float chamber assembly 22. Second cylindrical bore 154 extends transverse to cylindrical bore 152.

As shown in FIGS. 5, 6 and 7, valve shuttle 76 is an elongated cylindrical member which is mounted for movement within cylindrical bore 152. Valve shuttle 76 has an outer diameter slightly smaller than the inner diameter of cylindrical bore 152. Valve shuttle 76 has a vertical slot 156 into which shaft 114 extends. Vertical slot 156 defines an upper surface 158 and a lower surface 160. A resilient member 162 is securely attached to lower surface 160. A solid cylindrical seal 164 is attached to an upper surface 166 of valve shuttle 76.

As shown in FIG. 2, poppet valve assembly 26 includes a valve body assembly 170, a poppet assembly 172 and a diaphragm assembly 174.

Valve body assembly 170 includes an inner valve body section 176 and an outer valve body section 178. Inner valve body section 176 includes a horizontal throughbore 180, which extends between a left surface 182 of inner valve body section 176 and a first mating surface 184 of inner valve body section 176. Concentric with bore 180 is a first annular groove 186, a second annular groove 188, a third annular groove 190, and a fourth annular groove 192. First annular groove 186 is centrally located within inner valve body section 176. Second annular groove 188 has an inner diameter equal to the outer diameter of first annular groove 186 and is spaced between first annular groove 186 and left surface 182. Third annular groove 190 has an inner diameter equal to that of the outer diameter of second annular groove 188 and is disposed between second annular groove 188 and left surface 182. Fourth annular groove 192 has an inner diameter equal to that of first annular groove 186 defining therebetween a shoulder 194. Inner valve body section 176 defines an annular recess 196 having an inner diameter equal to the outer diameter of fourth annular groove 192. Recess 196 is defined by flat surface 198 which extends radially outwardly from the inner diameter of recess 196. Flat surface 198 has an edge in contact with the outer diameter 200 of recess 196. The surface defined by outer diameter 200 extends parallel to the longitudinal direction of inner valve body section 176 and blends into inclined wall 202 which extends radially outwardly therefrom. Inclined wall 202 terminates radially inwardly from the outer periphery of inner valve body section 176 with the outer edge thereof in contact with an inner edge of sealing section 204. Sealing section 204 extends radially outwardly from an inner edge thereof to the periphery of inner valve body section 176. A cylindrical bore 206 extends radially outwardly from outer diameter 200 of recess 196 to the periphery of inner valve body section 176.

Mounted within groove 186 is an o-ring 187 which provides a seal between the inboard section of valve body section 176 and float chamber assembly 22. It is preferred that all of the resilient seals that are in contact with the fluid contained in float chamber assembly 22 be made from viton. Mounted within groove 190 is an o-ring 191 which provides a seal between valve body section 176 and left surface 182.

Outer valve body section 178 includes a horizontal cylindrical through bore 208 having pipe threads on one end thereof. Bore 208 extends from an outer surface 210 of valve body section 178 therethrough. An annular groove 212 extends radially outwardly from bore 208. The outer diameter of annular groove 212 is the same as the inner diameter of a recess 214 which is the mirror image of recess 196. Recess 214 has an inclined wall 216 and a sealing surface 218.

Recesses 196 and 214 form inner chamber 222 into which diaphragm assembly 174 is mounted as explained in more detail below.

Diaphragm assembly 174 includes a resilient diaphragm 224, preferably formed of viton, which has its outer periphery in contact with and mounted between sealing surfaces 204 and 218 so as to divide inner chamber 222 into two sections, an inboard section which is in communication with the atmosphere through bore 206 and an outboard section in communication with outlet port 142 of pilot valve assembly 24. A plurality of bolts 226, as shown in FIG. 3, extend through inner valve body section 176, and outer valve body section 178 and extend into and are threadedly mounted in right wall 42. A pair of circular disks 228 are mounted on either side of diaphragm 224. Circular disks 228 have an outer diameter smaller than the inner diameter of chamber 222, so as to allow movement of diaphragm 224 therein. Circular disks 228 each have an outer lip 229 which extends outwardly from diaphragm 224. Circular disks 228 are suitably mounted to diaphragm 224 such as by a screw as shown in FIG. 2. A spring 231 has one end mounted in fourth annular groove 192 and the other end in contact with the inboard circular disk 228 so as to urge diaphragm 224 in a direction away from float chamber assembly 22.

Poppet assembly 172 includes a poppet stem 232, poppet head 234, poppet seal 238 and a screw 240. Poppet stem 232 is mounted for movement within poppet aperture 64 in right wall 42. Poppet head 234 is of a larger diameter than poppet stem 232 and is attached thereto by any suitable means such as screw 240. Poppet head 234 has resilient viton poppet seal 238 attached thereto which is disposed between poppet head 234 and right wall 42. A bushing 242 having a horizontal opening is slip fit into annular bore 188 and has an inner shoulder 244 for providing bearing support for poppet stem 232 and for capturing rod scraper seal 245. Seal 245 has a scraper end which serves to remove any abrasive material that may have bypassed strainer assembly 65.

As shown in FIG. 3, a tee 246 having a pipe thread extending from a central portion thereof is threadedly engaged in bore 208. The run portion of tee 246 has one end sealingly engaged with a tube 248 (shown schematically in FIG. 2) having fittings 250 on either end thereof. On the other end of the run portion of tee 246 is a plugged fitting 252 having a plug 254 having an orifice therein (not shown). A coupling 252 is in threaded engagement with horizontal passageway 142 on one end thereof and on the other end to fitting 250 connected to tube 248.

In operation, fluid enters float chamber assembly 22 through bottom opening 60 as shown in FIG. 2. Gas space above the fluid within chamber 22 is pressurized through top opening 58. Float 28 is buoyant on the fluid contained within float chamber assembly 22. As shown in FIG. 2, the liquid level in float chamber 22 is relatively low. When the liquid level is low, valve shuttle 76 remains in an upward closed position wherein shaft 114 of actuating pin 102 remains in contact with upper surface 158 of slot 156 in valve shuttle 76. This position is also shown in FIG. 5. In this position, seal 164 remains in contact with boss 146 thereby preventing pneumatic pressure from being communicated to outlet 142 and diaphragm 224.

As the fluid level in float chamber assembly 22 raises, float 28 moves upwardly causing pivotable arm 30 to pivot thereby causing cross shaft assembly 74 to rotate clockwise, as shown in FIGS. 6 and 8. Rotation of cross shaft assembly 74 in this direction causes actuating pin 102 to pivot downwardly within slot 156 until actuating pin 102 is brought into contact with resilient member 162 attached to lower surface 160 of slot 156. In this manner, there is lost motion whereby the liquid level contained within float chamber assembly 22 can vary without causing pilot valve assembly 24 to actuate poppet valve assembly 26. Valve shuttle 76 is maintained in the upper sealed position by internal pressure coming through inlet port 134. As the fluid level continues to rise within chamber 22, as shown in FIGS. 7 and 8, the force exerted by actuating pin compresses resilient member 162 thereby storing energy within resilient member 162. In this manner, resilient member 162 acts as a spring causing valve shuttle 76 to "snap" away from boss thereby allowing the pressure to be communicated from inlet port 134 to outlet port 136. It should be understood that resilient member 162 serves as a spring and therefore any structure which acts as a spring can be used herein so long as it is within the linkage between float 28 and valve shuttle 76.

When pilot valve assembly 24 is in the closed position, poppet valve assembly 172 and diaphragm assembly 174 remain in the closed position, as shown in FIG. 2. In the closed position, diaphragm assembly 174 is shown primarily disposed within recess 214, to the right of surfaces 204 and 218. Orifice 254 functions as a bleed hole thereby venting tube 248, hydraulic fittings 250 and hydraulic coupling 252 to atmosphere. The diameter of orifice 254 should be small so that pneumatic pressure is maintained in tube 248 when pilot valve 24 is open. A spring 231 biases diaphragm 224 and poppet assembly 170 into the closed position. Recess 196 is vented to atmosphere through bore 206.

When pneumatic pressure is communicated through tube 248 onto one side of diaphragm 224, a pressure differential is created thereacross so as to cause diaphragm 224 to overcome the bias of the spring 231 thereby moving diaphragm 224 towards float chamber 22. Poppet assembly 172 moves with diaphragm 224 causing poppet head 234 to move away from wall 43 thereby opening poppet valve 172. In this manner, fluid within float chamber assembly 22 drains from float chamber assembly 22 through poppet aperture 64 and through a bore (not shown). In other words, drain valve assembly 20 operates in batch made so that soft seated poppet valve assembly 172 is not subject to erosion due to throttling of abrasive material in the liquid to be drained.

As fluid drains from float chamber assembly 22, float 28 will move downwardly. The continued downward movement of float 28 causes the counterclockwise rotation of cross shaft assembly 74. Rotation of cross shaft assembly 74 in this direction causes the upward pivoting of actuating pin 102. The continued upward movement of actuating pin 102 causes seal 164 to be brought into sealing engagement with boss 146. Once seal 164 is brought into engagement with boss 146, pressure is no longer communicated between inlet port 134 and outlet port 136. Pneumatic pressure built up in tube 248 will vent through bore 220 until the pressure on the side of diaphragm 224 communicating with tube 248 is at atmospheric pressure. As the pressure is reduced spring 229 will bias diaphragm 224 to move in a direction away from float chamber assembly 22 thereby causing poppet head 234 and seal 238 to move into the closed position.

It should now be apparent that a pneumatically piloted float drain valve has been disclosed in which the float can be made smaller than in prior art designs and in which the drain valve seat area is not limited by the geometry of the float. It should also be understood that by sealing the liquid reservoir from the source of pneumatic pressure supplied to the pilot valve, it is possible to use either a low or high pressure supply source. It should further be understood that by placing a spring in the linkage between the float and valve shuttle that valve throttling of the pneumatic pilot supply pressure to the poppet valve can be eliminated.

While this invention has been described as having a preferred design, it is understood that it is capable of further modifications, uses and/or adaptations thereof following in general the principles of the invention including such departures that have been within known or customary practice in the art to which the invention pertains.

What is claimed:

1. A float controlled valve, comprising:

a float chamber for accumulating a fluid;

a float disposed within said float chamber for movement between minimum and maximum fluid levels;

a valve body defining a chamber therein having an inlet in communication with a source of pressure and an outlet, said valve having a valve seat between said inlet and said outlet;

a valve shuttle member disposed in said chamber of said valve body for reciprocal movement therein from a closed position wherein said source of pressure maintains said valve shuttle member in sealed relation to said valve seat and an open position wherein said valve shuttle member is not in sealed relation to said valve seat and wherein said inlet is in communication with said outlet; and a connecting member having a first segment and a second segment, said first segment engaging said float and said second segment engaging said valve shuttle member;

said valve shuttle member having a slot for receiving a portion of said second segment, said slot having an upper surface and a lower surface, said lower surface spaced from said upper surface, said valve shuttle member having a resilient member for providing snap action of said valve shuttle member in a direction away from said valve seat when said second segment acts upon said resilient member in response to the movement of said float as it approaches said maximum fluid level.

2. The float controlled valve of claim 1, wherein said float chamber is pressurized.

3. The float controlled valve of claim 1, wherein said valve body is mounted externally of said float chamber.

4. The float controlled valve of claim 1, wherein the source of pressure in communication with said inlet is a pneumatic pressure source independent from said float chamber.

5. The float controlled valve of claim 1, wherein said valve shuttle member has a cylindrical outer surface spaced from an inner wall of said cylindrical chamber.

6. The float controlled valve of claim 1, wherein said first segment extends in an opposite direction from which said second segment extends.

7. The float controlled valve of claim 1, wherein said resilient member is deformed by the movement of said second segment.

8. The float controlled valve of claim 7, wherein said cross shaft is mounted transverse relative to said valve shuttle member.

9. The float controlled valve of claim 1, wherein one of said valve body and said valve shuttle member carries a seal for sealing said inlet from said outlet when said valve shuttle member means is in sealed relation to said valve seat.

10. The float controlled valve of claim 1, wherein said float chamber has a side having an aperture, said connecting member extending through said aperture.

11. The float controlled valve of claim 1, wherein said first segment and said second segment of said connecting member are offset relative to each other.

12. The float controlled valve of claim 1, wherein said connecting member further comprises a cross shaft assembly mounted for rotational movement in said valve body, said first segment connected to a first portion of said cross shaft assembly and said second segment connected to a second portion of said cross shaft assembly.

13. The float controlled valve of claim 1, wherein said connecting member ms a pivotable member positioned to pivot between said first and second ends.

14. The float controlled valve of claim 1, wherein said connecting member is a pivotable member positioned to pivot between said first and second segments.

15. The float controlled valve of claim 13, wherein said pivotable member pivots at a fixed position between said first and second segments.

16. The float controlled valve of claim 14, wherein said pivotable member pivots at a fixed position between said first and second segments.

17. A float controlled valve, comprising:
a float chamber for accumulating a fluid;
a float disposed within said float chamber for movement between minimum and maximum fluid levels;
a valve body defining a chamber therein having an inlet in communication with a source of pressure and an outlet, said valve having a valve seat between said inlet and said outlet;
a valve shuttle member disposed in said chamber of said valve body for reciprocal movement therein from a closed position wherein said source of pressure maintains said valve shuttle member in sealed relation to said valve seat and an open position wherein said valve shuttle member is not in sealed relation to said valve seat and wherein said inlet is in communication with said outlet;
a connecting member having a first segment and a second segment, said first segment engaging said float and said second segment engaging said valve shuttle member;
said valve shuttle member having a slot for receiving a portion of said second segment, said slot having an upper surface and a lower surface, said lower surface spaced from said upper surface, said valve shuttle member having a resilient member for providing snap action of said valve shuttle member in a direction away from said valve seat when said second segment acts upon said resilient member in response to the movement of said float as it approaches said maximum fluid level; and
a poppet valve assembly operable by said valve shuttle member for draining the fluid contained in said chamber.

18. The drain valve of claim 17, wherein said poppet valve assembly comprises a diaphragm for sensing pressure communicated through said valve body and said poppet valve assembly, said diaphragm being movable in response to said pressure, said poppet valve assembly being movable in conjunction with and in response to the movement of said diaphragm.

19. The drain valve of claim 17, wherein said poppet valve assembly includes a diaphragm valve body defining a chamber therein, said diaphragm being mounted for movement in said chamber, said diaphragm having a marginal edge in sealed relation to said chamber such that said chamber is divided into a first section in communication with the atmosphere and a second section in communication with said valve body outlet.

20. The drain valve of claim 19, wherein said poppet valve assembly is operatively connected to said diaphragm and is movable in a first and a second direction therewith.

21. The drain valve of claim 18, wherein said poppet valve has an open position and a closed position, said poppet valve being in said open position when said valve shuttle member is in said open position and said poppet valve being in said closed position when said valve shuttle member is in said closed position.

22. The drain valve of claim 21, wherein said poppet valve assembly includes a poppet valve head and a poppet valve shaft attached on one end to said valve head and on the other end to said diaphragm.

23. The drain valve of claim 22, wherein said float chamber has an opening near the bottom thereof, said poppet valve shaft extending through said opening, said poppet head disposed within said float chamber.

24. The drain valve of claim 19, wherein said first section of said chamber is in fluid communication with the atmosphere and said second section is in fluid communication with said valve body outlet.

25. The drain valve of claim 23, wherein said poppet valve head has a larger circumferential diameter than the diameter of said opening in said float chamber.

26. The float controlled valve of claim 17, wherein said resilient member is compressed by the movement of said pivotable arm.

27. The float controlled valve of claim 17, wherein said resilient member is deformed by the movement of said second segment.

28. The float controlled valve of claim 17, wherein said valve shuttle member has a resilient portion attached to said lower surface of said slot.

29. The float controlled valve of claim 28, further comprising a resilient member for providing snap action of said valve shuttle member in a direction away from said valve seat in response to the movement of said float as it approaches said maximum fluid level.

30. The float controlled valve of claim 29, further comprising a resilient member for providing snap action of said valve shuttle member in a direction away from said valve seat in response to the movement of said float as it approaches said maximum fluid level.

31. The float controlled valve of claim 30, wherein said valve shuttle member has a slot defining upper and lower surfaces, said resilient member being attached to said lower surface of said slot, and said second segment deforming said resilient member as said float approaches the maximum fluid level.

32. The float controlled valve of claim 31, wherein said valve shuttle member has a slot defining upper and lower surfaces, said resilient member being attached to said lower surface of said slot, and said second segment deforming said resilient member as said float approaches the maximum fluid level.

33. The float controlled valve of claim 31, wherein said first segment and said second segment of said connecting member are offset relative to each other.

34. The float controlled valve of claim 28, wherein said first segment and said second segment of said connecting member are offset relative to each other.

35. The float controlled valve of claim 28, wherein said connecting member further comprises a cross shaft assembly mounted for rotational movement in said valve body, said first segment connected to a first portion of said cross shaft assembly and said second segment connected to a second portion of said cross shaft assembly.

36. The float controlled valve of claim 28, wherein said connecting member is a pivotable member positioned to pivot between said first and second segments.

37. The float controlled valve of claim 36, wherein said pivotable member pivots at a fixed position between said first and second segments.

38. The float controlled valve of claim 33, further comprising first, second and third seals disposed between said cross shaft and said valve body for providing a pressure tight seal therebetween, said first seal disposed at one end of said cross shaft, said second seal disposed between said first and second portions of said cross shaft, and said third seal disposed at one opposite end of said cross shaft.

39. The float controlled valve of claim 30, wherein said first segment and said second segment of said connecting member are offset relative to each other.

40. The float controlled valve of claim 30, wherein said connecting member further comprises a cross shaft assembly mounted for rotational movement in said valve body, said first segment connected to a first portion of said cross shaft assembly and said second segment connected to a second portion of said cross shaft assembly.

41. The float controlled valve of claim 30, wherein said resilient member relaxes from its deformed condition to a relaxed condition as said valve shuttle member moves from said closed position to said open position.

42. The float controlled valve of claim 30, wherein said connecting member is a pivotable member positioned to pivot between said first and second segments.

43. The float controlled valve of claim 42, wherein said pivotable member pivots at a fixed position between said first and second segments.

44. The float controlled valve of claim 43, wherein said second segment bears on said resilient member.

45. The float controlled valve of claim 30, wherein said resilient member is attached to said valve shuttle member.

* * * * *

UNITED STATES PATENT AND TRADEMARK OFFICE
CERTIFICATE OF CORRECTION

PATENT NO. : 5,638,859

DATED : June 17, 1997

INVENTOR(S) : Robert G. Thomson; et al.

It is certified that error appears in the above-identified patent and that said Letters Patent is hereby corrected as shown below:

In the Abstract, lines 15-16, delete "... such that that inlet is communication with the outlet." and replace with -- ... such that the inlet is communication with the outlet." --

Col. 1, line 26, delete "major limitation of the float trap that is the valve seat area..." and replace with -- major limitation of the float trap is that the valve seat area ..." --

Col. 1, line 43, after "SUMMARY" insert -- OF --

Col. 1, line 63, delete "popper" and insert -- poppet --

Col. 2, line 42, delete "popper" and insert -- poppet --

Col. 4, line 31, after "threaded" insert -- portion --

Col. 4, line 33, delete "portion" and insert -- portions --

Col. 5, line 67, delete "through bore" and insert -- throughbore -- (see Col. 5, line 26)

Col. 9, line 16, delete "ms" and insert -- is --

Col. 9, line 18, delete "1" and insert -- 17 --

Col. 9, line 66, delete "17" and insert -- 18 --

UNITED STATES PATENT AND TRADEMARK OFFICE
CERTIFICATE OF CORRECTION

PATENT NO. : 5,638,859
DATED : June 17, 1997
INVENTOR(S) : Robert G. Thomson; et al.

It is certified that error appears in the above-identified patent and that said Letters Patent is hereby corrected as shown below:

Col. 10, line 32, delete "compressed" and insert - - deformed - -

Col. 10, line 33, delete "pivotable arm." and insert - - second segment. - -
Col. 10, line 62, delete "31" and insert - - 30 - -

Signed and Sealed this

Twenty-third Day of February, 1999

Attest:

Q. TODD DICKINSON

Attesting Officer     Acting Commissioner of Patents and Trademarks